US011668435B2

(12) United States Patent
Luna

(10) Patent No.: US 11,668,435 B2
(45) Date of Patent: Jun. 6, 2023

(54) ATTACHABLE FLUID LEAK CAPTURE ASSEMBLY FOR VEHICLES

(71) Applicant: Alberto Luna, Farmington Hills, MI (US)

(72) Inventor: Alberto Luna, Farmington Hills, MI (US)

(*) Notice: Subject to any disclaimer, the term of this patent is extended or adjusted under 35 U.S.C. 154(b) by 64 days.

(21) Appl. No.: 17/355,425

(22) Filed: Jun. 23, 2021

(65) Prior Publication Data
US 2021/0404602 A1 Dec. 30, 2021

Related U.S. Application Data

(60) Provisional application No. 63/053,667, filed on Jul. 19, 2020, provisional application No. 63/044,369, filed on Jun. 26, 2020.

(51) Int. Cl.
*F16N 31/00* (2006.01)
*F01M 11/10* (2006.01)
*F16N 31/02* (2006.01)

(52) U.S. Cl.
CPC ............ *F16N 31/00* (2013.01); *F01M 11/10* (2013.01); *F16N 31/02* (2013.01)

(58) Field of Classification Search
CPC ....... F16N 31/00; F16N 31/006; B65D 90/24; F16L 55/00; B65B 5/04; B29C 65/002
See application file for complete search history.

(56) References Cited

U.S. PATENT DOCUMENTS

| 3,785,451 | A | * | 1/1974 | McCord | B32B 27/12 |
| | | | | | 180/69.1 |
| 5,417,310 | A | * | 5/1995 | Halseth | F16N 31/006 |
| | | | | | 141/86 |
| 5,711,402 | A | * | 1/1998 | Sumpter, Sr. | F16N 31/006 |
| | | | | | 180/69.1 |
| 8,540,056 | B2 | * | 9/2013 | Bentley | F16N 31/02 |
| | | | | | 184/106 |
| 2004/0079345 | A1 | * | 4/2004 | Collins | F01P 9/02 |
| | | | | | 123/41.01 |
| 2007/0029336 | A1 | * | 2/2007 | Posada | F16N 31/002 |
| | | | | | 220/573 |

* cited by examiner

*Primary Examiner* — Syed O Hasan
(74) *Attorney, Agent, or Firm* — Kohn & Associates PLLC

(57) ABSTRACT

An attachable fluid leak capture assembly including a mesh carrier having an absorbing media pad embedded therein, and an attachment mechanism for attaching the mesh carrier to a leaking vehicle or machinery part. A method of capturing fluids from vehicles or machines, by attaching the attachable fluid leak capture assembly to a vehicle or machine part leaking fluid through the attachment mechanism and absorbing the leaking fluid onto the absorbing media pad.

19 Claims, 9 Drawing Sheets

ATTACHABLE FLUID LEAK CAPTURE ASSEMBLY FOR VEHICLES

BACKGROUND OF THE INVENTION

1. Technical Field

The present invention relates to devices and methods for capturing leaks from vehicles.

2. Background Art

There are several different fluids that can leak out of vehicles or other machinery and cause stains on public roads, cement or asphalt driveways, garages, parking lots, or other surfaces. Transmissions, power steering systems, radiators, water pumps, hoses, windshield wiper systems, motor oil systems, and engines can all have issues with leaking fluids when there are compromised seals or gaskets. Fluids leaking can be caused by problematic or failed original equipment manufacturer "breather vents" or "vent tubes" designed to equalize pressure in various powertrain vehicle enclosures.

Currently, the problem of leaking fluids is dealt with by using mats or catch basins on a floor surface to capture the fluids. Some mats are particularly designed to catch vehicle fluids. DRYMATE® oil spill mats are made of a durable and absorbent polyester fiber with a water-proof backing and come in different sizes to position under a vehicle. They are able to soak up leaking fluids and they can be cleaned with soap and water. New Pig Corporation produces an absorbent mat roll with a leak-proof backing that can be cut to size with perforations. The mat roll is made of eight layers of thermal bonded 100% polypropylene and is washable for reuse. While these mechanisms can be effective, they only work in areas where the mats have been installed and when the vehicle is stationary.

U.S. Patent Application Publication No. 2007/0029336 to Posada discloses an oil leak diaper that is a flattened, rectangular semi flexible assemblage containing oil absorbent material having several tension-adjustable series of connectors. The diaper is located under the oil-leaking site where the oil is received, absorbed and retained within the diaper itself. There are several drawbacks to this device. Metal is used throughout the design (oil absorbent holder is hardware wire cloth or mosquito screen) and the device is not completely recyclable. There is no ability to only replace the oil absorbent material and not replace the entire device. There is not effective heat transfer of vehicle components through the device because the absorbent material takes up the entire surface of the assemblage. The assemblage uses a metallic screen backing and can heat up. The device further requires tools for assembly.

There remains a need for a method of catching vehicle fluids when the vehicle is not in a home garage as well as while moving that is also recyclable and easily replaceable.

SUMMARY OF THE INVENTION

The present invention provides for an attachable fluid leak capture assembly including a mesh carrier having an absorbing media pad embedded therein, and an attachment mechanism for attaching the mesh carrier to a leaking vehicle or machinery part.

The present invention provides for a method of capturing fluids from vehicles or machines, by attaching the attachable fluid leak capture assembly to a vehicle or machine part leaking fluid through the attachment mechanism and absorbing the leaking fluid onto the absorbing media pad.

DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

Figure 1:
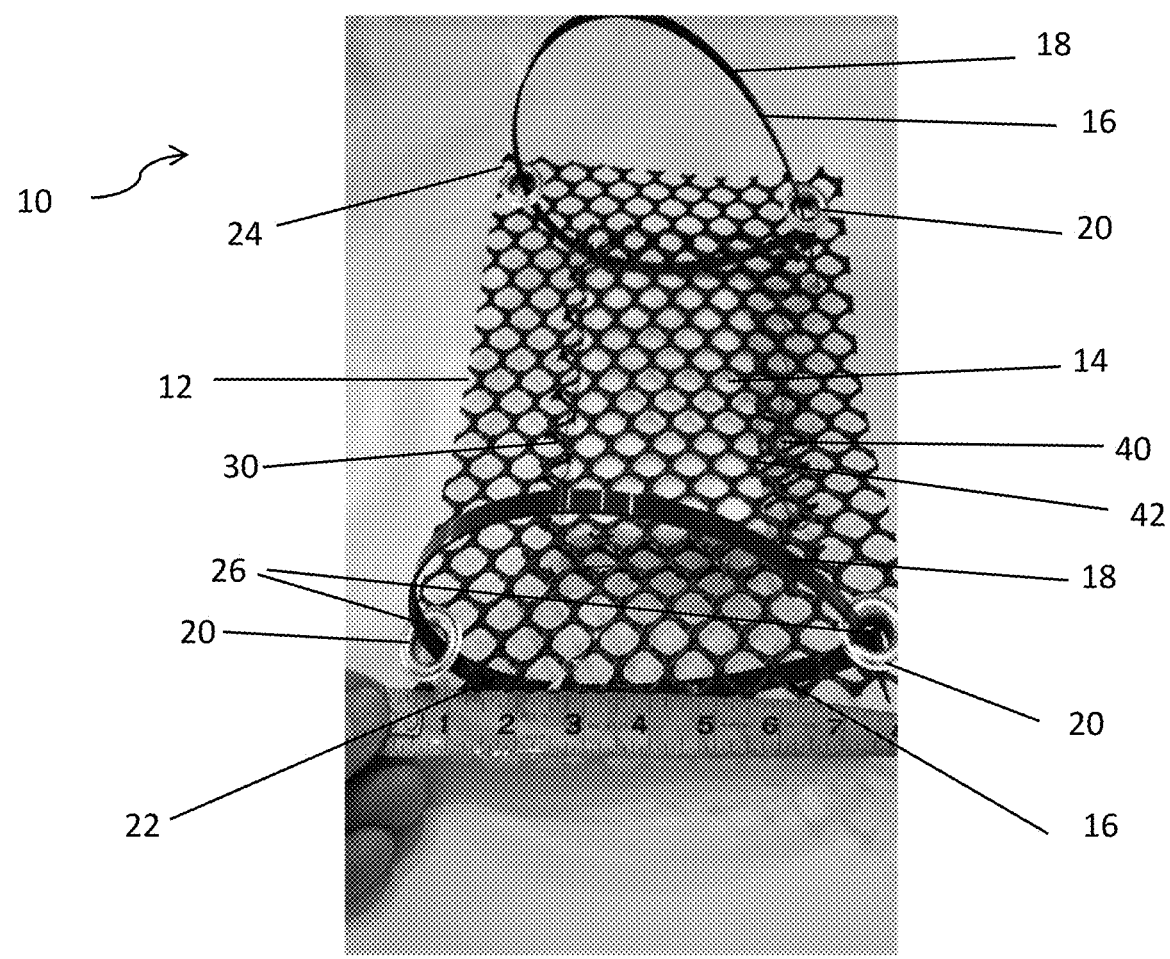
FIG. 1 is a top perspective view of the attachable fluid leak capture assembly.

The present invention provides for an attachable fluid leak capture assembly, shown at 10 in FIG. 1, that can be directly attached to a vehicle or other machinery components for capturing fluids that are leaking before they reach a ground surface. The attachable fluid leak capture assembly 10 includes a mesh carrier 12 having an absorbing media pad 14 embedded therein, and an attachment mechanism 16 for attaching to a leaking vehicle or machinery part.

Figure 2:
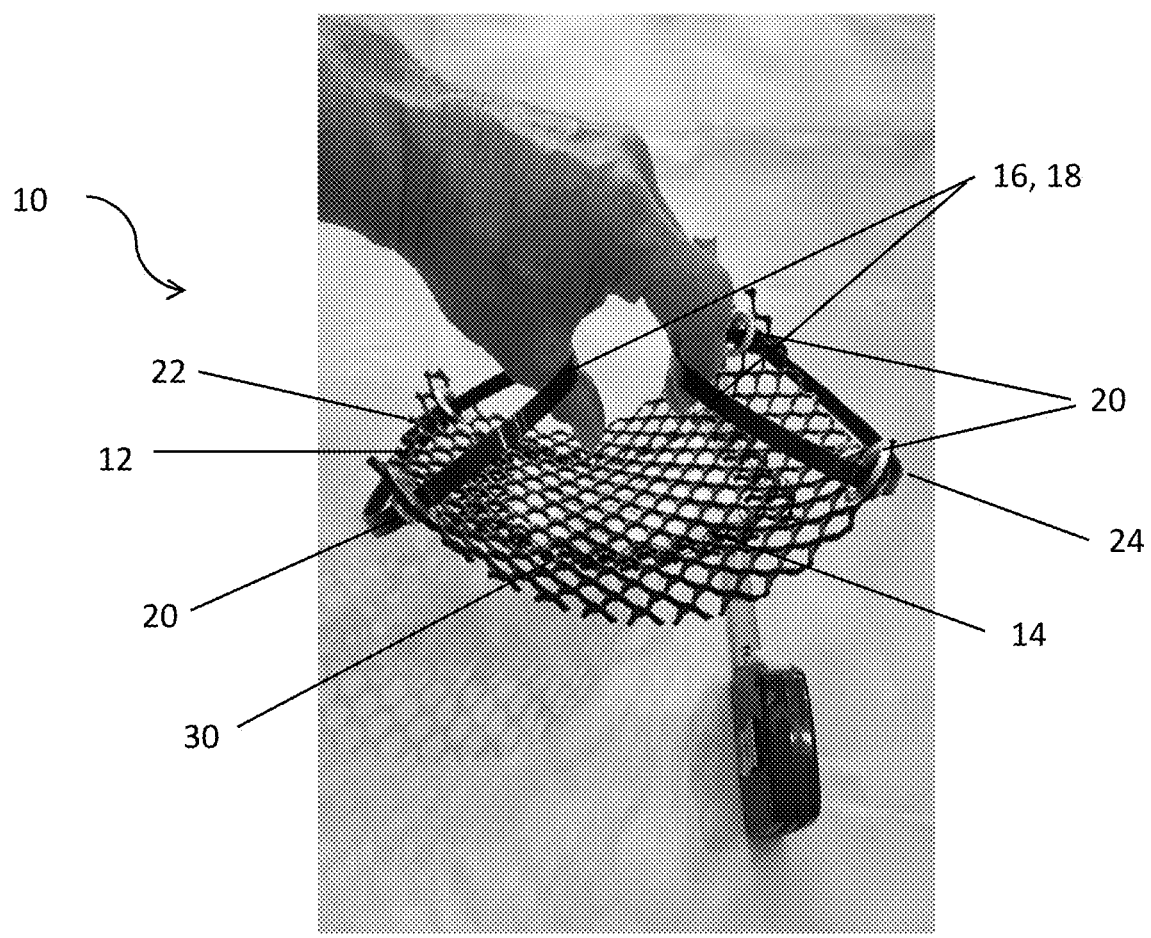
FIG. 2 is a side perspective view of the flexibility of the mesh carrier.

The mesh carrier 12 is preferably made of a flexible, highly durable, and temperature resistant polymeric mesh that also allows for heat transfer from vehicle and machine parts, such as, but not limited to, polypropylene, ethylenetetrafluoroethylene copolymer, polytetrafluoroethylene (PTFE), polyamide, polyetheretherketone, polyethylene terephthalate, or polypropylene. Using a flexible material can provide minimal surface contact with the vehicle as well as enables easy installation and fits various contoured shapes of vehicle components, as shown in FIG. 2. The mesh carrier 12 can have a diamond pattern to assist in its flexibility, however, other patterns can also be used. The mesh carrier 12 is essentially a flat, planar shape that can flex to surround a particular component. The polymeric mesh can also be recyclable as well as provide a lightweight design. The mesh carrier 12 can also be made of metal mesh, solid molded alloy, or solid molded plastic. The mesh carrier 12 can be sized to fit particular components of a vehicle or machinery and can come in various sizes according to diameter and shape of the component. The mesh carrier 12 can further include a flexible frame 74 (shown in FIG. 9) made from the same materials as the mesh carrier 12 that provides support to the edge of the mesh carrier 12.

The absorbing media pad 14 is embedded and retained within the mesh carrier 12 (for example, within a pocket or pouch 30 of the mesh carrier 12, or with other attachment mechanisms). The pocket 30 can include a mesh base layer 40 (i.e., part of the mesh carrier 12) to carry the absorbing media pad 14 and a top mesh layer 42. The absorbing media pad 14 can be cut to size, centered, and placed on top of the mesh base layer 40, and then the top mesh layer 42 can be placed onto the absorbing media pad 14 to form the pocket 30. At least three edges of the pocket 30 can be sonic welded or heat welded to permanently bond the mesh base layer 40 with the mesh top layer 42 in order to enclose or embed the absorbing media pad 14. One edge of the pocket 30 can remain unsealed as an access point for future replacement of the absorbing media pad 14. The unsealed edge can be temporarily sealed or stitched in place using beaded cable ties, zip ties, metal wiring, or other suitable securing mechanisms. The securing mechanisms can easily be woven or looped along the outer edge of the pocket 30 via the open-grid mesh structure as a means to adjoin the base mesh layer 40 and the top mesh layer 42.

Figure 6:
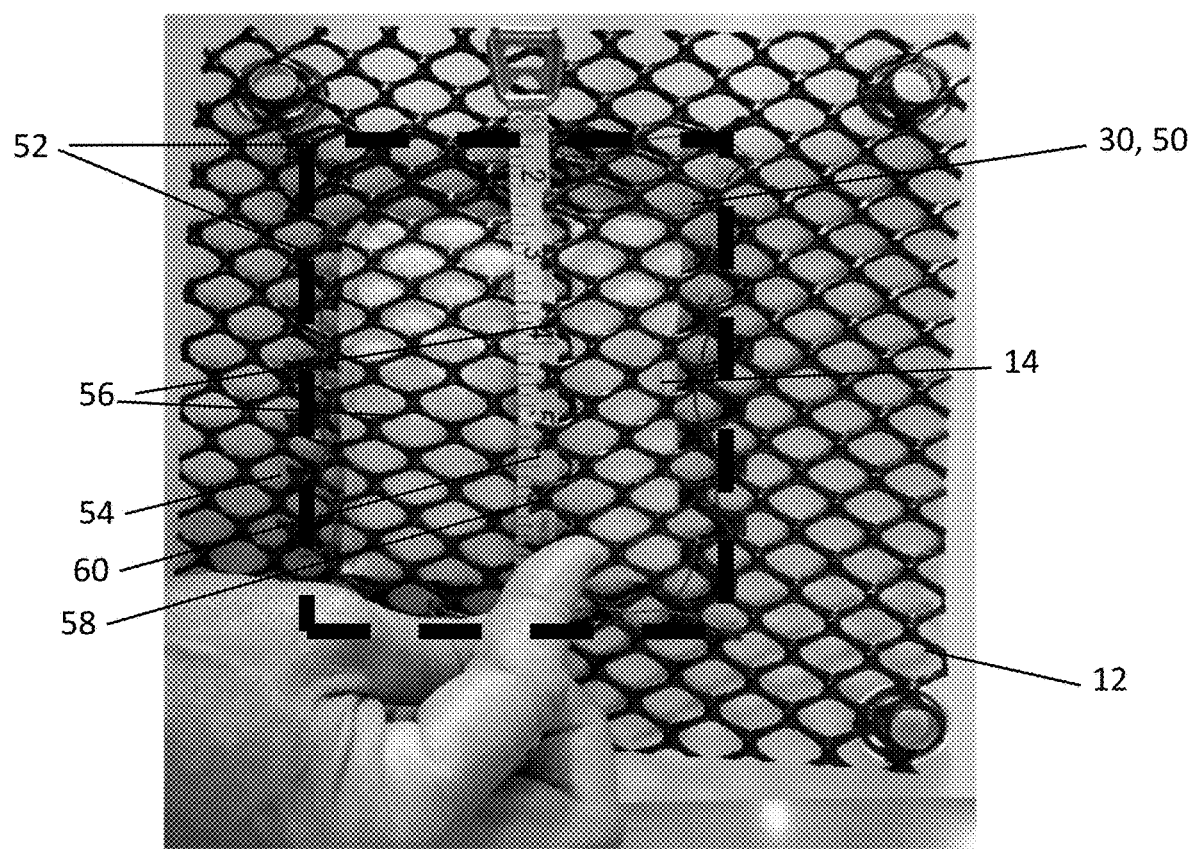
FIG. 6 is a top perspective view of an envelope pillowcase closure for the absorbing media pad.
Figure 7:
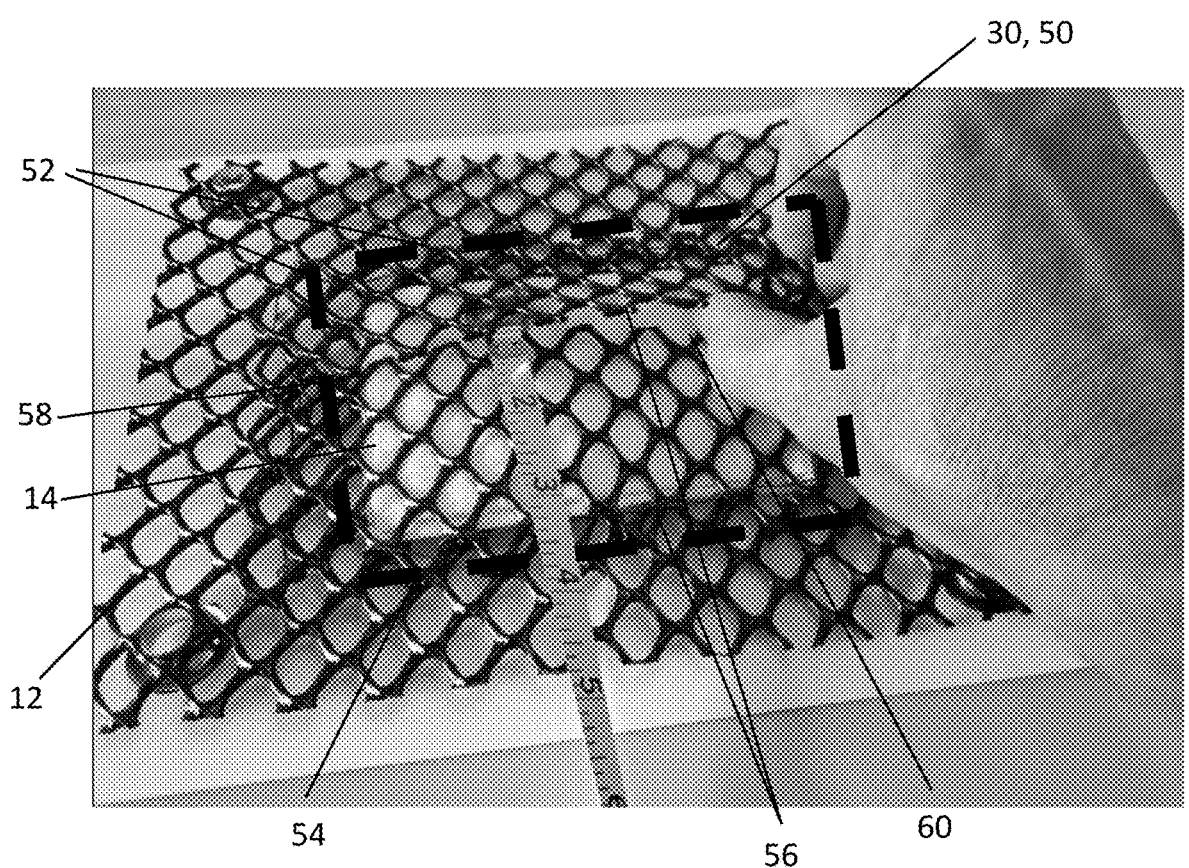
FIG. 7 is a side perspective view of an envelope pillowcase closure for the absorbing media pad.
Figure 8:
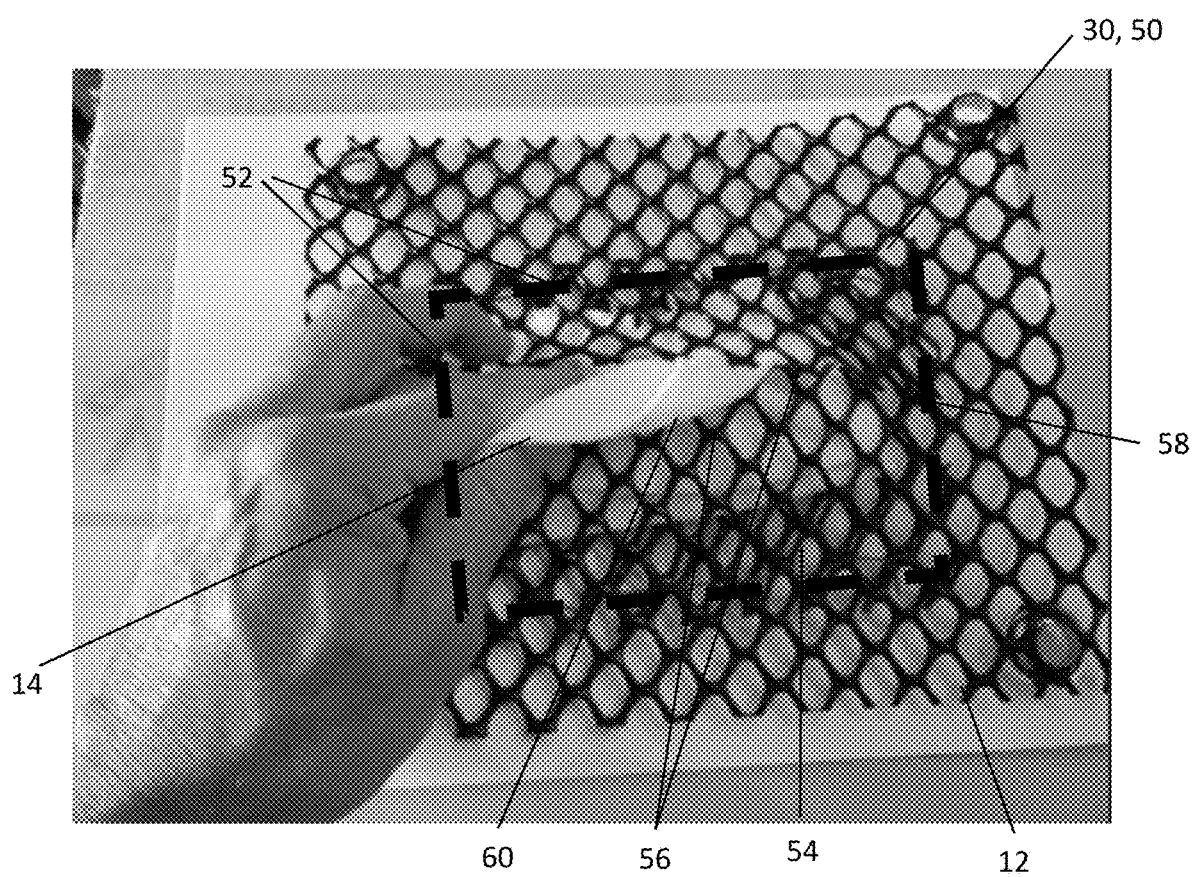
FIG. 8 is a top perspective view of removing the absorbing media pad from the envelope pillowcase structure.

Alternatively, the absorbing media pad 14 can be retained within an envelope pillowcase closure 50 in the mesh carrier 12, shown in FIGS. 6-8. In this design, the pocket 30 includes four seamed edges 52 securing a back panel 54 of mesh and two overlapping panels 56 that meet at a center point 58. The overlapping panels 56 form an access point 60 where a used absorbent media pad 14 can be accessed and replaced, as shown in FIG. 8. When the mesh carrier 12 is installed, the access point 60 faces towards the base of the leaking vehicle component, and away from the road surface to further secure the absorbing media pad 14.

The absorbing media pad 14 is made of a material that is able to absorb all standard vehicle fluids, such as oils, fuels, and petroleum-based products, while repelling water. Examples of materials include 3M® (HP-156/HP-255), OIL-DRI® L90850 (polypropylene), or PIG® Oil-Only Absorbent Mat Roll MAT401. The absorbing media pad 14 is compatible with operating vehicle component temperatures and is not flammable. The absorbing media pad 14 can also incorporate various medias such as, but not limited to, oil sorbent media, oil sorbent and water repellent media, oil coalescing media, or oil desiccant media. The absorbing media pad 14 can be sized to fit particular components of a vehicle or machinery and can come in various sizes according to diameter and shape of the component. The absorbing media pad 14 can also be in a variety of thicknesses to accommodate different fluids or leak rates.

The attachment mechanism 16 can be adjustable zip ties 18 that fit through grommets 20 on a proximal end 22 and distal end 24 of the mesh carrier 12. Grommets 20 can be positioned close to or on edges or corners 26 of the mesh carrier 12. Adjustable zip ties 18 and grommets 20 can be a temperature resistant plastic, such as PTFE, enabling a lightweight design and recycling, or metal. The adjustable zip ties 18 loop through the grommets 20 and around a desired vehicle or machinery component and secure the proximal end 22 and distal end 24 to the vehicle or machinery component. Any other plastic or metal attachment mechanisms 16 can also be used.

Figure 9:
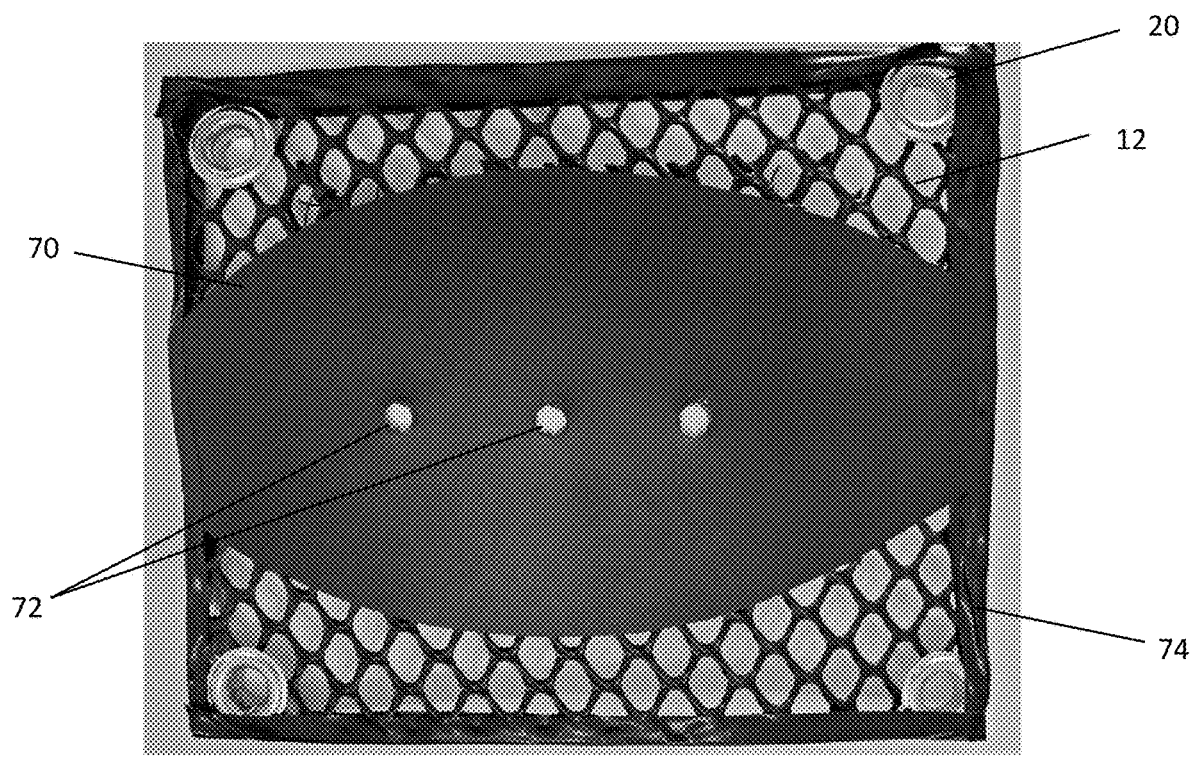
FIG. 9 is a top view of a protective skid pad on the mesh carrier.

The mesh carrier 12 can optionally include a protective skid pad 70 operatively connected thereto as shown in FIG. 9. The protective skid pad 70 is designed to protect the integrity of the mesh carrier 12 and reduce the effects of potential impact to the attachable fluid leak capture assembly 10 from roadside hazards e.g., water, snow, rocks, dirt, mud etc. The protective skid pad 70 preferably faces the roadside and can include a plurality of drain ports 72 that prevent elements such as water and melted snow from being retained on the protective skid pad 70. The protective skid pad 70 can be made of any high density-low friction polymeric materials (such as any thermoplastics, PTFE, polyimide, polyetheretherketone (PEEK), polyphenylene sulfide (PPS), nylon, acetal, or polyester) or a metal material. The protective skid pad 70 can cover at least a portion of the mesh carrier 12, and preferably an area surrounding the absorbing media pad 14.

The attachable fluid leak capture assembly 10 can be used to capture any vehicle fluid, such as, but not limited to, motor oil, transmission fluid, gear box oil, coolant, brake fluid, power steering fluid, wiper fluid, or water.

Figure 3:
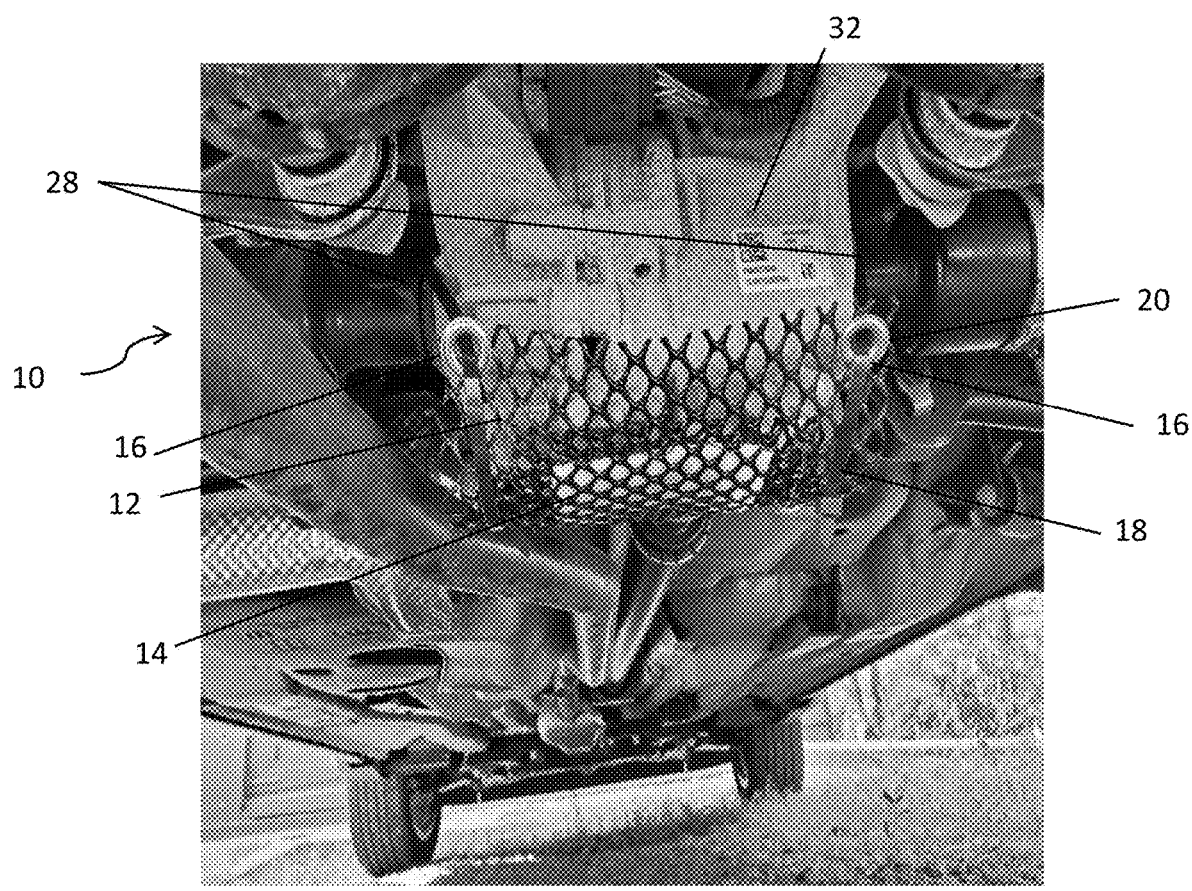
FIG. 3 is a bottom perspective view of the attachable fluid leak capture assembly attached to a rear differential of a car.
Figure 4:
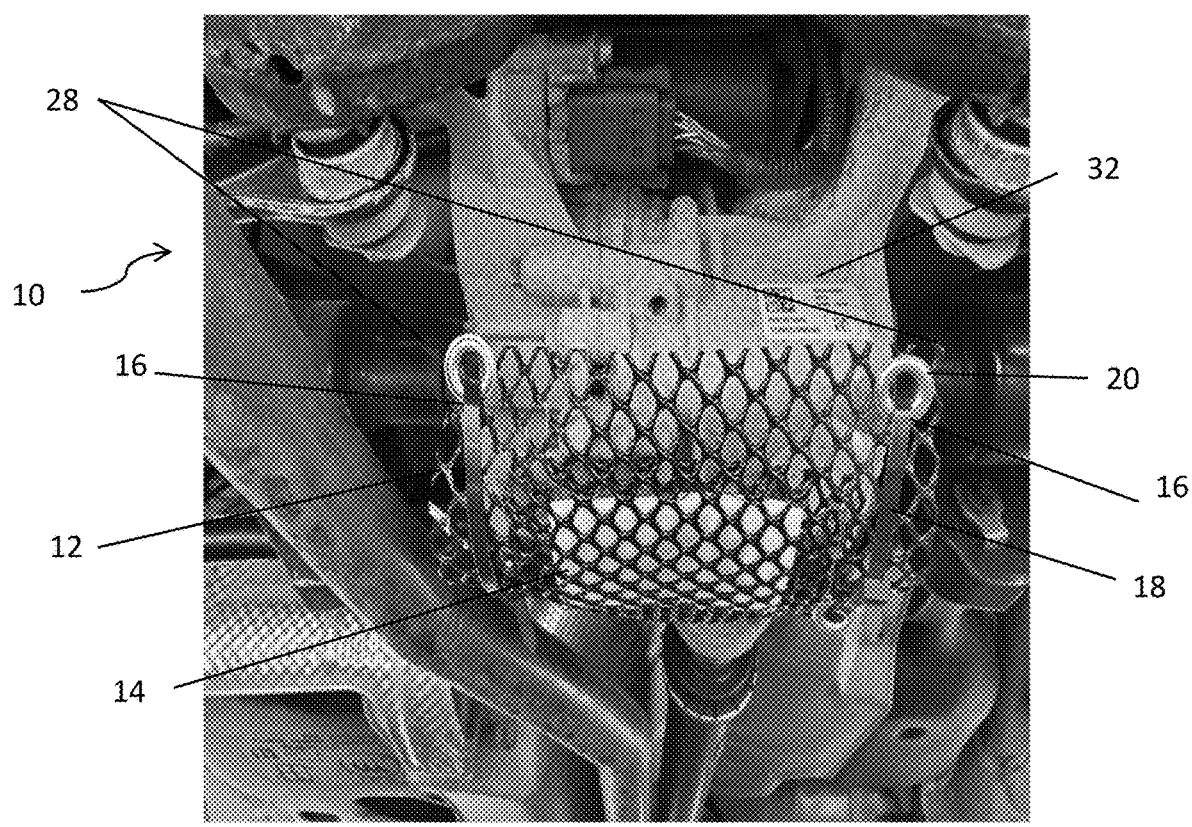
FIG. 4 is a bottom perspective view of the attachable fluid leak capture assembly attached to a rear differential of a car.
Figure 5:
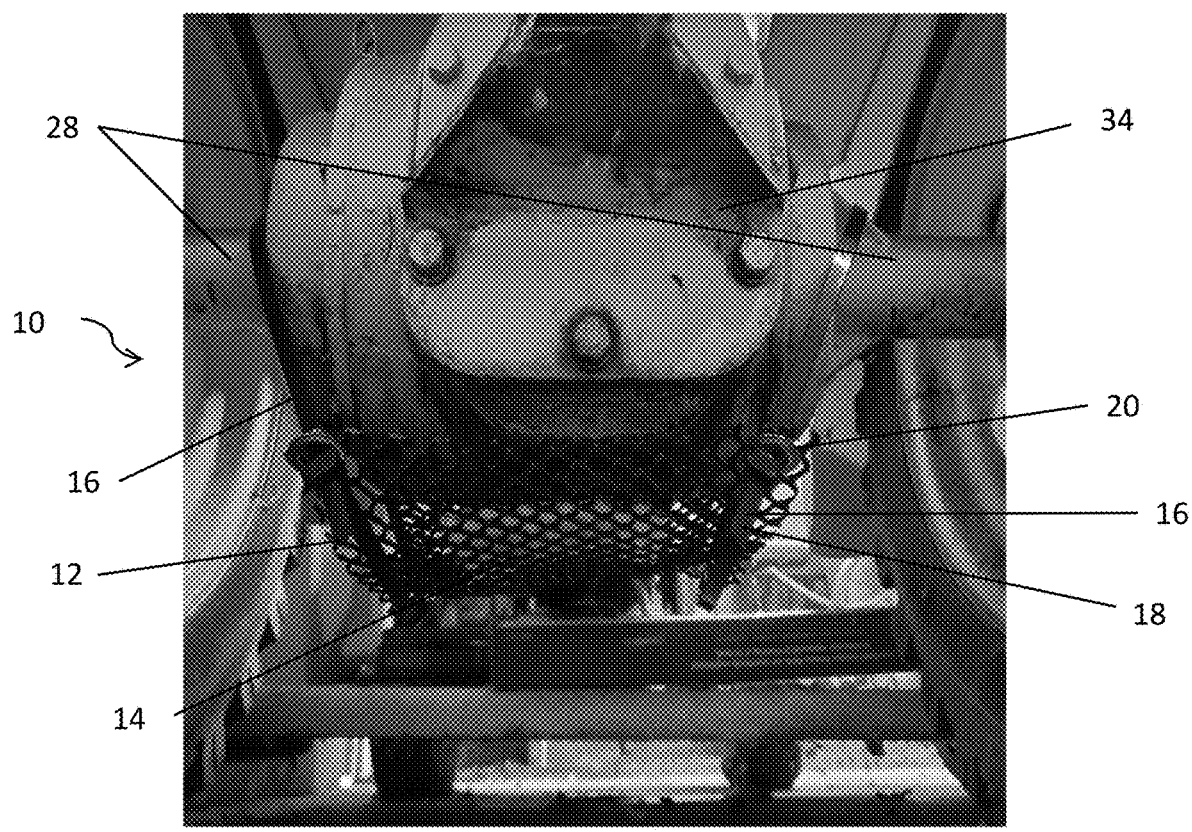
FIG. 5 is a bottom perspective view of the attachable fluid leak capture assembly attached under a gear box of an industrial type vehicle.

The attachable fluid leak capture assembly 10 can be used with many different vehicles including, but not limited to, passenger cars, trucks, semi-trucks, construction vehicles, agricultural vehicles, or industrial type vehicles. The attachable fluid leak capture assembly 10 can also be used with any other machinery. The attachable fluid leak capture assembly 10 can be directly attached to any vehicle component or machinery component that is leaking, such as, but not limited to, front or rear differential case, transmission, or radiator. For example, FIGS. 3 and 4 show the attachable fluid leak capture assembly 10 attached to a rear differential 32 of a car. The attachment mechanism 16 is attached at an axle housing 28. FIG. 5 shows the attachable fluid leak capture assembly 10 attached under a gear box 34 of an industrial type vehicle and the attachment mechanism 16 is attached at an axle housing 28.

As part of the vehicle's scheduled oil change maintenance program, the attachable fluid leak capture assembly 10 can be completely replaced once the absorbing media pad 14 becomes visibly saturated with automotive fluid, or just the absorbing media pad 14 can be replaced. Oil change stations, vehicle service departments, and do-it-yourselfers can perform this service with relative ease.

The present invention provides for a method of capturing fluids from vehicles, by attaching the attachable fluid leak capture assembly 10 to a vehicle part leaking fluid through the attachment mechanism 16 and absorbing the leaking fluid onto the absorbing media pad 14. The attachable fluid leak capture assembly 10 can be positioned in a manner that allows the absorbing media pad 14 the maximum exposure to the component leak (typically towards the base of the vehicle component). As described above, the attachable fluid leak capture assembly 10 can be attached by threading adjustable zip ties 18 through grommets 20 of the mesh carrier 12 and around a component part and securing. This method can be performed while the vehicle is stationary or while moving. This method prevents vehicle fluids from dripping from the vehicle and staining various floor surfaces. Adjustable zip ties 18 can easily be cut to remove the attachable fluid leak capture assembly 10 from the vehicle when desired, the absorbing media pad 14 that is full of fluid removed, and a new absorbing media pad 14 can be inserted in the mesh carrier 12. Alternatively, the absorbing media pad 14 can be replaced without removing the entire assembly 10 as it can remain attached to the vehicle or machine part.

The present invention provides advantages over the prior art, especially U.S. Patent Application Publication No. 2007/0029336 described above. The present invention can be 100% recyclable due to the materials used. The absorbing media pad 14 is easily replaceable when full or dirty without the need to remove or replace the entire attachable fluid leak capture assembly 10. The present invention provides effective heat transfer of vehicle components because the absorbing media pad 14 does not take up the entire mesh carrier 12. The mesh carrier 12 is also heat resilient because it can be made with polymeric materials or plastic. The present invention can also be easily assembled to a vehicle without tools.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise.

What is claimed is:

1. An attachable fluid leak capture assembly consisting essentially of a mesh carrier having an absorbing media pad embedded therein, and an attachment mechanism for attaching said mesh carrier to a leaking vehicle, wherein said mesh carrier includes an access point allowing for said absorbing media pad to be replaced without removing said mesh carrier from said leaking vehicle, and wherein said attachment mechanism is temperature resistant plastic adjustable zip ties that are placed through grommets on a proximal end and a distal end of said mesh carrier, and loop around a vehicle component to secure said proximal end and said distal end to the vehicle component.

2. The attachable fluid leak capture assembly of claim 1, wherein said mesh carrier is a flat and planar shape that flexes to surround a vehicle or machinery part.

3. The attachable fluid leak capture assembly of claim 1, wherein said mesh carrier is made of a flexible polymeric mesh material chosen from the group consisting of polypropylene, ethylene-tetrafluoroethylene copolymer, polytetrafluoroethylene, polyamide, polyetheretherketone, polyethylene terephthalate, and polypropylene.

4. The attachable fluid leak capture assembly of claim 1, wherein said mesh carrier includes a diamond pattern.

5. The attachable fluid leak capture assembly of claim 1, wherein said mesh carrier is made of a material chosen from the group consisting of metal mesh, solid molded alloy, and solid molded plastic.

6. The attachable fluid leak capture assembly of claim 1, wherein said attachable fluid leak capture assembly is recyclable.

7. The attachable fluid leak capture assembly of claim 1, wherein said absorbing media pad is retained within a pocket of said mesh carrier made of a mesh base layer and a top mesh layer operatively secured together.

8. The attachable fluid leak capture assembly of claim 7, wherein said mesh base layer and top mesh layer are secured by a mechanism chosen from the group consisting of sonic welding and heat welding.

9. The attachable fluid leak capture assembly of claim 7, wherein said pocket includes an unsealed side for accessing and replacing said absorbing media pad, and wherein said unsealed side is temporarily sealable with a securing mechanism.

10. The attachable fluid leak capture assembly of claim 1, wherein said absorbing media pad is retained within an envelope pillowcase closure in said mesh carrier.

11. The attachable fluid leak capture assembly of claim 1, wherein said absorbing media pad is made of a material that absorbs oils, fuels, and petroleum-based products and repels water.

12. The attachable fluid leak capture assembly of claim 1, wherein said absorbing media pad includes a media chosen from the group consisting of oil sorbent media, oil sorbent and water repellent media, oil coalescing media, and oil desiccant media.

13. The attachable fluid leak capture assembly of claim 1, wherein said mesh carrier further includes a protective skid pad operatively attached thereof having a plurality of drain ports.

14. A method of capturing fluids from vehicles or machines, including the steps of: attaching an attachable fluid leak capture assembly to a vehicle leaking fluid through an attachment mechanism, wherein the attachable fluid leak capture assembly consists essentially of a mesh carrier having an absorbing media pad embedded therein, and the attachment mechanism for attaching the mesh carrier to a leaking vehicle, wherein the mesh carrier includes an access point allowing for the absorbing media pad to be replaced without removing said mesh carrier from said vehicle, wherein the attachment mechanism is temperature resistant plastic adjustable zip ties that are placed through grommets on a proximal end and a distal end of the mesh carrier, and loop around a vehicle component to secure the proximal end and the distal end to the vehicle component; and absorbing the leaking fluid onto the absorbing media pad.

15. The method of claim 14, wherein said attaching step is further defined as threading adjustable zip ties through grommets in the mesh carrier and around a vehicle or machinery component and securing the mesh carrier to the vehicle component.

16. The method of claim 14, wherein said absorbing step is further defined as absorbing a fluid chosen from the group consisting of motor oil, transmission fluid, gear box oil, coolant, brake fluid, power steering fluid, and wiper fluid.

17. The method of claim 14, further including the step of removing the attachable fluid leak capture assembly by cutting the adjustable zip ties, removing the absorbing media pad, inserting a new absorbing media pad, and reattaching the attachable fluid leak capture assembly to the vehicle part.

18. The method of claim 14, further including the step of replacing the absorbing media pad while the attachable fluid leak capture assembly is attached to the vehicle part.

19. The method of claim 14, further including the step of providing effective heat transfer of the vehicle part while attached.

* * * * *